United States Patent
Stupp

[11] Patent Number: 6,069,761
[45] Date of Patent: May 30, 2000

[54] APPARATUS, AND ASSOCIATED METHOD, FOR PROTECTING A MAGNETORESISTIVE SENSOR FROM DAMAGE DURING A THERMAL ASPERITY EVENT

[75] Inventor: Steven Elliot Stupp, Mountain View, Calif.

[73] Assignee: Quantum Corporation, Milpitas, Calif.

[21] Appl. No.: 09/050,565

[22] Filed: Mar. 30, 1998

[51] Int. Cl.[7] .................................. G11B 5/03; G11B 5/02
[52] U.S. Cl. .................................. 360/66; 360/25
[58] Field of Search .................... 360/66, 61, 25, 360/46, 113

[56] References Cited

U.S. PATENT DOCUMENTS

| | | | |
|---|---|---|---|
| 5,523,898 | 6/1996 | Jove et al. | 360/66 |
| 5,650,887 | 7/1997 | Dovek et al. | 360/75 |
| 5,956,197 | 9/1999 | Le et al. | 360/67 |
| 5,969,523 | 10/1999 | Chung et al. | 360/66 |
| 5,978,163 | 11/1999 | Cunningham | 360/66 |

*Primary Examiner*—W. Chris Kim
*Attorney, Agent, or Firm*—Hogan & Hartson

[57] ABSTRACT

Apparatus, and an associated method, protects against damage to a magnetoresistive sensor of a disk drive assembly, or other magnetic storage device, responsive to a thermal asperity event. Detection is made of the resistance of the magnetoresistive sensor. If the resistance increases, indicative of a temperature increase occurring as a result of a thermal asperity event, a full-sense current, or current of other appropriate magnitude is applied to the sensor, thereby to prevent alteration by the magnetic field of portions of the magnetoresistive sensor.

14 Claims, 5 Drawing Sheets

APPARATUS, AND ASSOCIATED METHOD, FOR PROTECTING A MAGNETORESISTIVE SENSOR FROM DAMAGE DURING A THERMAL ASPERITY EVENT

The present invention relates generally to magnetoresistive sensors used in a computer mass storage device, such as a hard disk drive assembly. More particularly, the present invention relates to apparatus, and an associated method, for preventing damage to the magnetoresistive sensor as a result of a thermal asperity event.

An asperity on the surface of an electromagnetic storage media positioned proximate to the magnetoresistive sensor can cause a temperature increase of the magnetoresistive sensor. Such an event is called a thermal asperity. The temperature increase can result in damage to the sensor. Damage can occur, for instance, as the magnetic orientations of portions of the magnetoresistive sensor are susceptible to alteration as a result of the temperature increase caused by the thermal asperity event.

Operation of an embodiment of the present invention causes the application of a full sense, or other increased-magnitude, current to the magnetoresistive sensor upon detection of a temperature asperity event. By applying such a current to the magnetoresistive sensor, permanent alteration of portions of the magnetoresistive sensor is prevented by the magnetic field.

BACKGROUND OF THE INVENTION

A disk drive assembly is a computer, mass-storage device from which data may be read and/or to which such data may be written. Typically, a disk drive assembly includes one or more randomly-accessible rotatable storage media, or disks, upon which the data is encoded by various means. In a magnetic disk drive, the data is encoded thereon as bits of information comprising magnetic field reversals grouped in tracks on the magnetically-hard surface of the rotating disk or disks. When the disk drive assembly includes a plurality of disks, the disks are typically stacked in a generally parallel and spaced relationship and affixed at their inner-diameters to a common hub.

A spindle motor imparts rotational forces to rotate the rotatable storage media at a rotational speed. A head transducer, such as a magnetoresistive sensor is positionable proximate to the rotating storage media to read the data from the magnetic media forming the storage media. The magnetoresistive sensor detects magnetic field signal changes from the magnetic media. Such detection is made due to changes in the resistance of the magnetoresistive sensor responsive to changes in the direction and amount of magnetic field being sensed by the sensor.

The magnetoresistive sensor is supported by an actuator arm. Movement is imparted to the actuator arm and, hence, to the magnetoresistive sensor by appropriate actuation of a voice coil motor of an actuator assembly. Successive read and write operations can be selectively performed by suitably positioning and repositioning the magnetoresistive sensor, and associated inductive write transducer, proximate to selected locations of the storage media.

Advancements in technology have permitted the development and implementation of successive generations of disk drive assemblies of ever-improving performance characteristics and memory capacities by employing ever-smaller physical sizes for the critical dimensions in the drive components.

Several problems inherent to a disk drive assembly become increasingly problematical, however, when attempts are made to provide a disk drive assembly of improved performance and increased memory capacity, with smaller sizes for critical dimensions in the drive components.

One such problem pertains to asperities. An asperity is formed, e.g., by a particulate positioned, sometimes not fixedly, upon the magnetic storage media. An asperity can also be formed by a surface irregularity of the storage media. Such an asperity can result in a collision with the magnetoresistive sensor as the location at which the asperity is positioned is rotated into proximity with the sensor. When a collision occurs, thermal energy is generated and is imparted to the sensor, thereby causing a temperature increase of the sensor.

A magnetoresistive sensor is susceptible to damage as a result of such temperature increase. As magnetoresistive sensors are constructed to be of increasingly smaller sizes, the thermal energy imparted by a thermal asperity to a smaller-sized, magnetoresistive sensor shall become an increasingly significant problem. Viz., as the same amount of thermal energy is imparted to a sensor of reduced size, the temperature increase of the sensor shall be correspondingly greater.

In at least one construction of a magnetoresistive sensor, the sensor includes an antiferromagnetic (AFM) layer which is used to pin a pinned layer of the sensor by way of an exchange magnetic field. If the thermal energy imparted to the magnetoresistive sensor is great enough such that the AFM layer approaches or exceeds its Néel temperature, irreversible damage to the magnetoresistive sensor might occur. Subsequent to the thermal asperity event, the AFM layer of the magnetoresistive sensor cools. But, such cooling occurs in the presence of a random magnetic field associated with the magnetic field emanating from the magnetic storage media. Such magnetic field emanating from the disk might alter the resultant orientation of the magnetic exchange field of the AFM layer. And, such changed orientation might permanently alter the transfer curve of the magnetoresistive sensor and its resultant output signal. If extensive, such alteration might destroy the operability of the magnetoresistive sensor.

A manner by which to protect the magnetoresistive sensor from damage due to a thermal asperity event advantageously shall increase the reliability of a disk drive assembly, or other computer mass storage device, in which the magnetoresistive sensor is embodied.

It is in light of this background information related to magnetoresistive sensors that the significant improvements of the present invention have evolved.

SUMMARY OF THE INVENTION

The present invention, accordingly, advantageously provides apparatus, and an associated method, which protects against damage from occurring to a magnetoresistive sensor as a result of a thermal asperity event.

Detection is made of when a magnetoresistive sensor exhibits characteristics representative of collision with an asperity upon the magnetic storage media positioned proximate thereto. When detection of a thermal asperity event is made, a full sense current, or other increased-magnitude current, is applied to the magnetoresistive sensor. In one embodiment, the full sense current is of a level substantially corresponding the current level applied to the sensor when the sensor is in the active state. The full sense current is continued to be applied to the magnetoresistive sensor for at least as long as the increased temperature associated with the collision is detected. As the magnetoresistive sensor cools, the cooling shall occur in a controlled magnetic field, i.e., the magnetic field associated with the full sense current. Thereby, the appropriate magnetic orientation of the antiferromagnetic layer in the magnetoresistive sensor is maintained, and thereby to prevent damage to the magnetoresistive sensor.

In one aspect of the present invention, protection is provided to each of the magnetoresistive sensors of a multi-disk, disk drive assembly. Low-level sense currents are provided sequentially, or otherwise, to each of the magnetoresistive sensors of the disk drive assembly. Detection is made, responsive to application of the low-level sense currents, of characteristics of a magnetoresistive sensor representative of a thermal asperity event associated with the asperity upon the storage media positioned proximate to a magnetoresistive sensor of the disk drive assembly. If such detection is made, a full sense, or other increased-magnitude, current is caused to be applied to the affected magnetoresistive sensor for at least the duration of the thermal asperity event. Application of the full sense current to the affected magnetoresistive sensor maintains the magnetic orientation of the antiferromagnetic layer of the magnetoresistive sensor as the sensor cools subsequent to the thermal asperity event.

In one implementation, a multiplexor is coupled between a current source and the magnetoresistive sensors of the disk drive assembly. Thereby, a single current source can be used to apply low-level currents to each of the magnetoresistive sensors upon appropriate actuation of the multiplexor. In another implementation, separate current signal generators are provided for each of the magnetoresistive sensors, thereby permitting low-level currents to be applied to the magnetoresistive sensors concurrently.

In these and other aspects, therefore, damage-protection apparatus, and an associated method, is provided for at least one magnetoresistive sensor operable to detect magnetic field changes of a magnetic storage medium. The sensor is susceptible to a thermal asperity event associated with an asperity on the magnetic storage medium. A current signal generator is at least selectively coupled to the magnetoresistive sensor. The current signal generator selectively generates at least a first-magnitude current signal and a second-magnitude current signal. The first-magnitude current signal is at least selectively applied to the magnetoresistive sensor when the magnetoresistive sensor is in a non-active state. A detector is coupled to the magnetoresistive sensor for detecting a characteristic of the magnetoresistive sensor representative of occurrence of the thermal asperity event. A controller is coupled to the detector and to the current signal generator. The controller receives an indication of detection by the detector of the occurrence of the thermal asperity event and causes the current signal generator to generate the second-magnitude current signal for at least a selected time period subsequent to detection of the occurrence of the thermal asperity event. When the second-magnitude current is applied to the magnetoresistive sensor, damage is prevented thereto.

A more complete appreciation of the present invention and to the scope thereof can be obtained from the accompanying drawings which are briefly summarized below, the following detailed description of the presently-preferred embodiments of the invention, and the appended claims.

DETAILED DESCRIPTION

Figure 1:
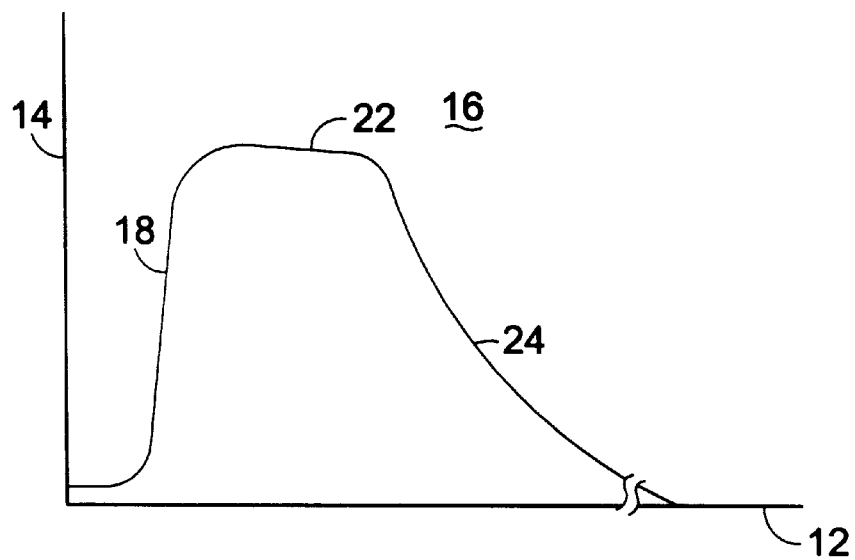
FIG. 1 illustrates a graphical representation of thermal changes of a magnetoresistive sensor during a thermal asperity event.

Referring first to FIG. 1, the thermal changes of a magnetoresistive sensor responsive to the occurrence of a thermal asperity event in the sensor is plotted as a function of time, scaled in terms of seconds along the abscissa axis 12 is shown. The thermal changes, scaled in terms of centigrade degrees along the ordinate axis 14 forms a resultant plot 16. As illustrated, upon occurrence of the thermal asperity event, a rapid increase in temperature, here indicated on the order of 10 nanoseconds, shown by the plot portion 18, occurs. The temperature increase remains for the duration of the contact with the asperity event, indicated by the plot portion 22. Subsequent to the termination of contact with the asperity, the temperature of the magnetoresistive sensor falls gradually, indicated by the plot portion 24. The "cooling-off" represented by the plot portion 24, is much more gradual than the rate at which the temperature increase occurs at the initiation of the thermal asperity event.

If the temperature increase of the magnetoresistive sensor is great enough to approach a phase-change temperature, referred to as the Néel temperature, of an antiferromagnetic (AFM) layer of the magnetoresistive sensor, operation of the sensor might be permanently altered or damaged. When the AFM layer approaches the phase-change temperature, the magnetic moments of the layer might become rearranged as the layer cools during the cooling-down period. Because of the proximity of the AFM layer to magnetic storage media, the magnetic moments of the AFM layer are susceptible to becoming rearranged corresponding to the magnetic orientation of the portion of the magnetic storage media proximate to the sensor. Such reorientation of the AFM layer also results in changes to other layers of the magnetoresistive sensor.

Operation of an embodiment of the present invention prevents such reorientation of the magnetic moments of the AFM layer and other layers in the sensor, and the resultant altered operation, or damage to, the magnetoresistive sensor.

Figure 2:
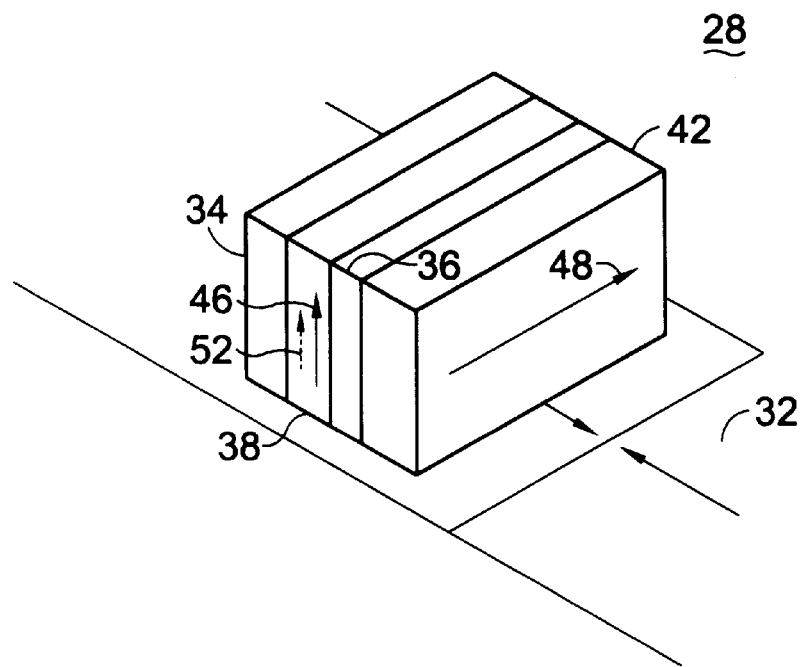
FIG. 2 illustrates a partial functional block diagram, partial schematic view of a magnetoresistive sensor indicating net magnetizations in portions thereof when the magnetoresistive sensor is positioned in the vicinity of a magnetic transition recorded on magnetic storage media.

FIG. 2 illustrates a magnetoresistive sensor, shown generally as 28, operable to "read" magnetic changes defining data recorded on magnetic storage media, here a magnetic disk 32 of a disk drive assembly.

The magnetoresistive sensor 28 is here shown to include the aforementioned AFM layer, here indicated at 34. The AFM layer 34 pins a pinned layer 36 of the sensor 28 by way of an exchange field 38. The sensor 28 further includes a free layer 42 spaced apart from the pinned layer by a spacer not shown. The magnetization of the free layer 42 is permitted freedom of movement responsive to the magnetic field of portions of the magnetic storage media 32 as such portions of the storage media pass proximate to the sensor 28. Arrows 46 and 48 indicate directions of net magnetizations of the pinned layer 36 and free layer 42, respectively. And, the exchange field, $H_e$ is indicated by the arrow 52 shown in dash. As shown, the magnetoresistive sensor 28 is conventional in nature to detect magnetic state transitions upon the magnetic storage media 32.

In the event of a thermal asperity event, the thermal levels of the magnetoresistive sensor 28 are susceptible to be elevated in the manner such as that shown in the graphical representation of FIG. 1. An embodiment of the present invention is operable to prevent alteration of the magnetic moments of the AFM layer 34 or the pinned layer 36 from altering operation of the sensor 28 or otherwise causing permanent damage to the sensor.

Figure 3:
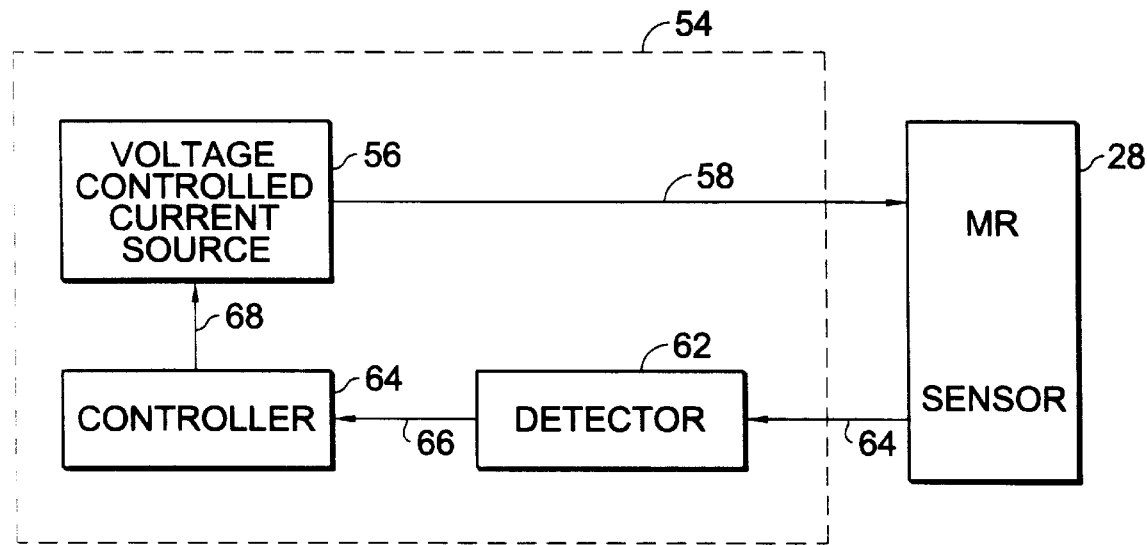
FIG. 3 illustrates a functional block diagram of an embodiment of the present invention by which to protect a magnetoresistive sensor from damage as a result of a thermal asperity event.

FIG. 3 illustrates the apparatus, shown generally at 54, of an embodiment of the present invention. The apparatus 54 is operable to protect a magnetoresistive sensor, such as the sensor 28, as a result of a thermal asperity event.

The apparatus 54 includes a current source, here a voltage-controlled current source 56, which at least selectively applies, by way of the line 58, a low-level sense current to the sensor 28 and, alternately, selectively also a current of a greater magnitude, such as a current of a level corresponding to a full-sense signal used when the sensor 28 is in the active state. A detector, here a level detector 62 is coupled to the sensor 28 by way of the line 64. The detector is operable to detect when the resistance of the sensor 28 increases beyond a threshold level. As resistance of the sensor 28 is directly proportional to its temperature, a temperature rise of the sensor 28 as a result of a thermal asperity event is detected by the detector 62 as a result of the corresponding increase in resistance of the sensor 28.

The detector 62 is coupled to a controller 64 by way of the line 66. The controller 64 is operable, at least responsive to detection by the detector 62 of the increased resistance of the sensor 28 to cause, by the line 68, the current source 56 to generate the current signal of the greater magnitude for at least a selected time period. In one implementation, the controller 64 causes the current source to generate the current of the greater magnitude for so long as the detector 62 detects the resistance of the sensor 28 to be greater than the threshold level. The current signal of the greater magnitude, in one embodiment, is also of a direction opposite, or otherwise dissimilar, to that of the low-level sense current.

Application of the current of the greater magnitude to the sensor 28 maintains the magnetic field orientation of the AFM layer 34 or the pinned layer 36 (shown in FIG. 2) in a desired orientation. Problems associated with reorientation of the magnetic moments of these layers and resultant altered operation, or failure of, the magnetoresistive sensor 28 is prevented; protection against damage to the sensors is thereby provided.

Figure 4:
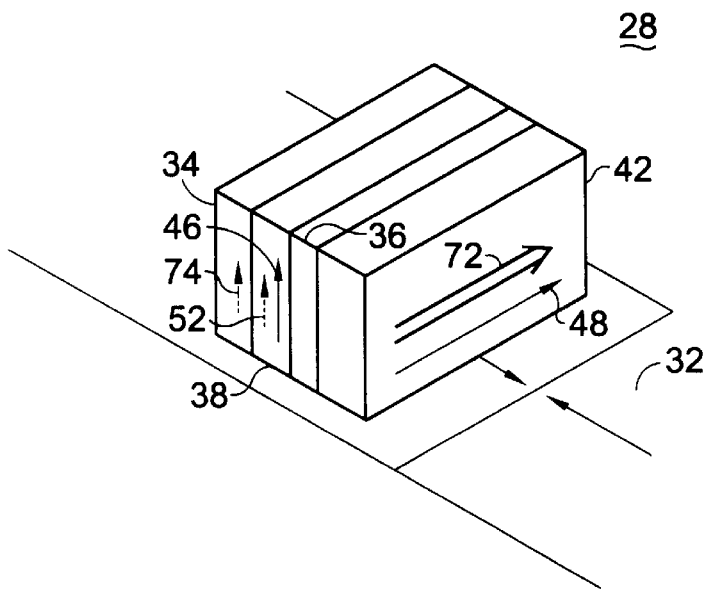
FIG. 4 illustrates a partial functional block diagram, partial schematic view, similar to that in FIG. 2, here illustrating net magnetic fields in portions of the magnetoresistive sensor subsequent to a thermal asperity event responsive to operation of an embodiment of the present invention.

FIG. 4 again illustrates the magnetoresistive sensor 28, shown previously in FIG. 2. The sensor 28 is identical to that shown in FIG. 2. Viz., the sensor 28 is positioned proximate to the magnetic storage media 32 and includes the AFM layer 34, the pinned layer 36 spaced apart from the layer 34 by the exchange field 38 and the free layer 42 spaced apart from the pinned layer by way of the spacer not shown. The net magnetization indicated by the arrow 46 and the net magnetic field 52 is again indicated by the arrows in the Figure. The illustration of FIG. 4 further illustrates the net magnetization of the free layer, indicated by the arrow 48 and the sense current, indicated by the arrow 72. The sense current is also present in the spacer 44 and the pinned layer 38. And, the magnetic field present in the AFM layer 34, generated during operation of the apparatus 54 shown in FIG. 3, is also indicated in the Figure, here by the arrow 74, shown in dash.

Figure 5:
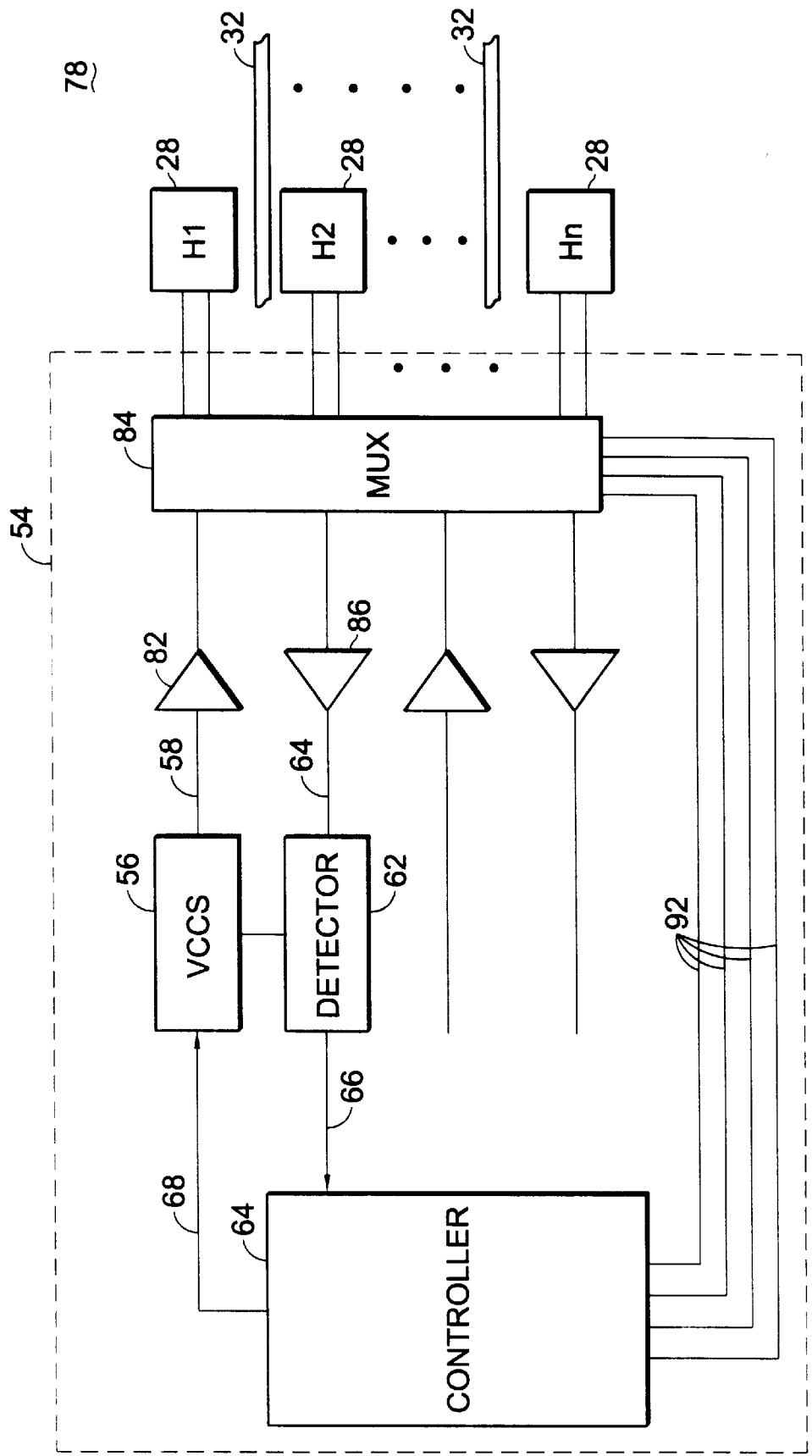
FIG. 5 illustrates a functional block diagram of portions of a disk drive assembly having a plurality of magnetoresistive sensors in which an embodiment of the present invention is operable.

FIG. 5 illustrates portions of a disk drive assembly, shown generally at 78, in which the apparatus 54 of an embodiment of the present invention is operable. Here, the disk drive assembly 78 includes a stack of storage disks 32 proximate to which a plurality of magnetoresistive sensors 28 are positioned. A thermal asperity event might cause a temperature increase of any of the magnetoresistive sensors 28. Operation of the apparatus 54 detects the presence of a thermal asperity event affecting any of the sensors 28 and increases the current applied to the affected sensor to ensure that the operation of such affected sensor is not altered or damaged.

The apparatus 54 is here again shown to include a voltage-control current source 56 which generates current signals on the line 58. Here, the line 58 is coupled to a preamplifier 82 to amplify the signal. And, the amplifier is coupled to a multiplexor 84. The multiplexor, in turn, is coupled to each of the sensors 28. The multiplexor 84 is operable to selectably apply the current signal generated by the current source 56 to selected ones of the sensors 28. The apparatus 54 is further again shown to include a detector 62 coupled to the line 64. Here, the line 64 is coupled to an amplifier 86 which, in turn, is coupled to the multiplexor 84 and, in turn, to selected ones of the sensors 28. Again, the detector is operable to detect resistance levels of the sensors 28 which exceed a selected level, indicative of a thermal asperity event.

The apparatus 54 is again shown to include a controller 64, coupled to the detector 62 by way of the line 66 into the current source by way of the line 68. The controller 64 is again operably responsive to detection by the detector 62 of characteristics representative of a thermal asperity event. The controller 64 is here further coupled, by way of the lines 92, to the multiplexor 84 to control operation thereof. Thereby, when detection is made by the detector 62 that a particular one, or more than one, of the sensors 28 is of increased resistance levels, the controller is operable to cause the current source 56 to generate current signals of increased magnitudes to the affected sensor or sensors.

Figure 6:
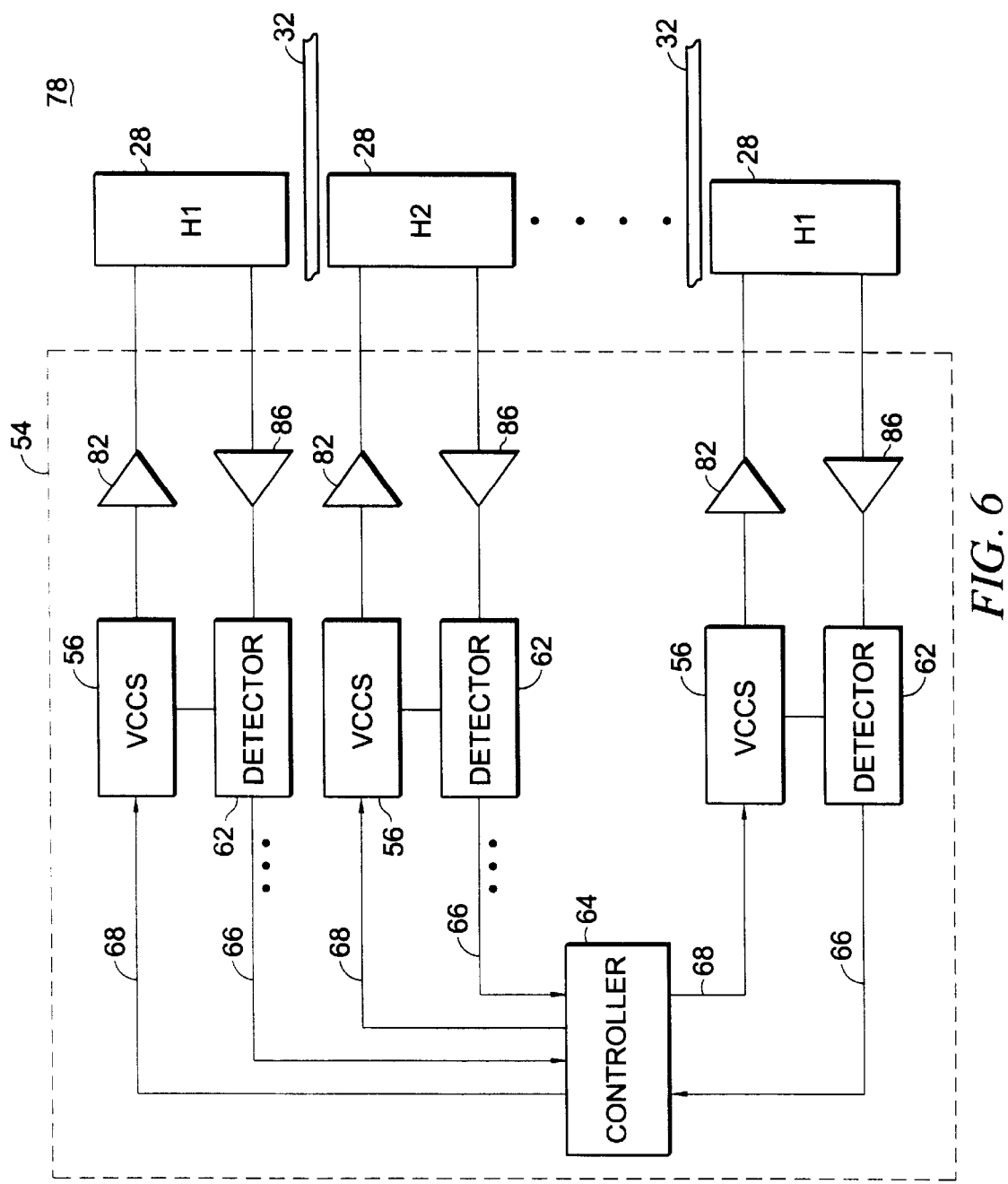
FIG. 6 illustrates a functional block diagram, similar to that shown in FIG. 5, but in which another embodiment of the present invention is operable.

FIG. 6 illustrates a disk drive assembly 78 including the apparatus 54 of another embodiment of the present invention. Here again, the disk drive assembly includes a plurality of magnetic storage disks 32 and magnetoresistive sensors 28. Here, the apparatus 54 includes a plurality of voltage-controlled current sources 56 and detectors 62 wherein each sensor 28 has associated therewith a separate current source 56 and detector 62. Amplifiers 82 and 86 are also coupled to each of the sensors 28. In this embodiment, multiplexing of current signals generated by a single source is obviated. Instead, each of the sensors 28 can be, if desired, continuously monitored.

While not separately shown, in other embodiments, combinations of the implementations of the apparatus 54 shown in FIGS. 5 and 6 may be formed. For instance, the current signals applied to the sensors 28 may be multiplexed, but each of the sensors may have associated therewith a detector 62. Or, each of the sensors 28 may have associated therewith a current source 56, but a detector 62 may be multiplexed to the various sensors.

Figure 7:
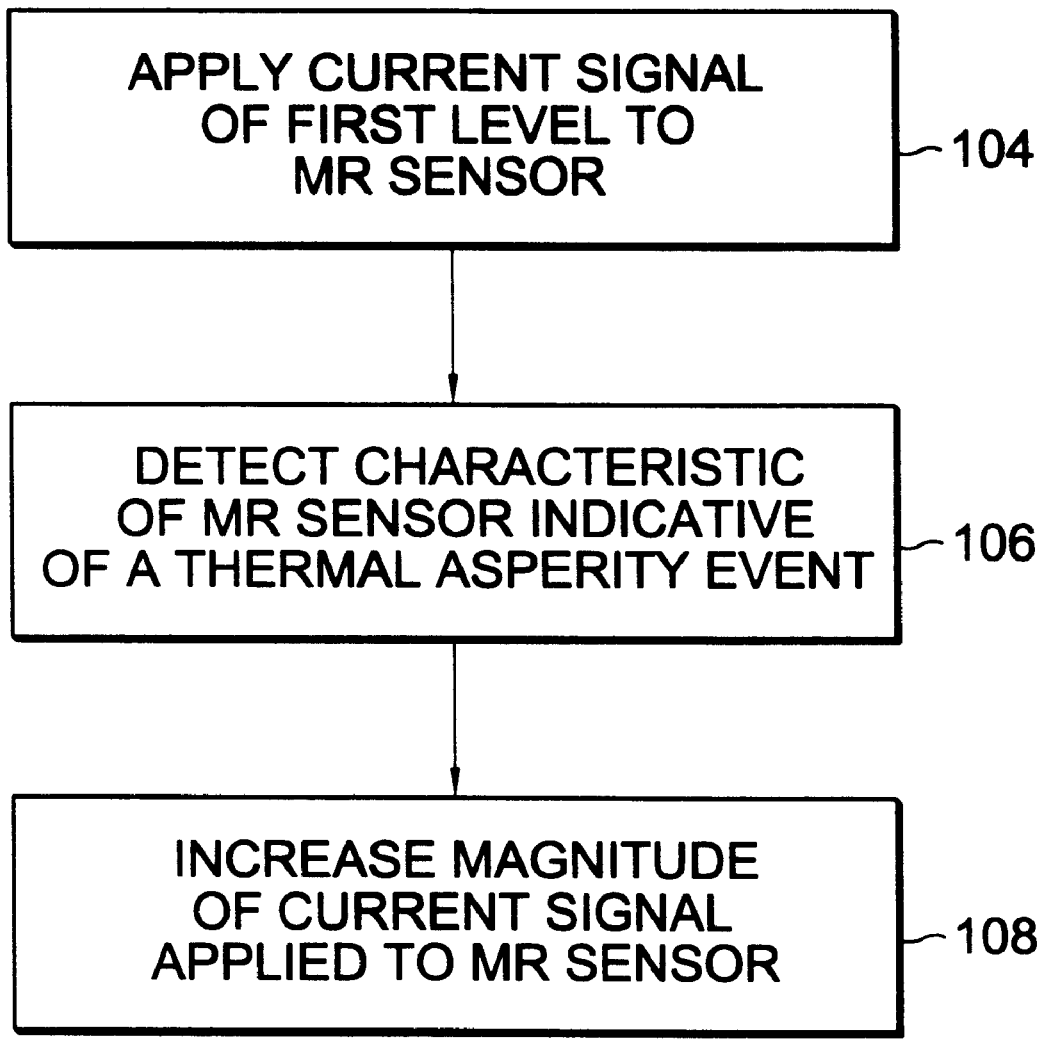
FIG. 7 illustrates a method flow diagram listing the method steps of the method of operation of an embodiment of the present invention.

FIG. 7 illustrates the method, shown generally at 102 of an embodiment of the present invention. The method protects at least one magnetoresistive sensor against damage responsive to a thermal asperity event.

First, and as indicated by the block 104, a current signal of a first level is applied to the magnetoresistive sensor. Then, and as indicated by the block 106, detection is made of a characteristic of the sensor indicative of a thermal asperity event.

If detection is made indicative of a thermal asperity event, and as indicated by the block 108, a current signal of increased magnitude is applied to the sensor, thereby to prevent damage from occurring to the sensor. Thereby, manner is provided by which to prevent damage to the magnetoresistive sensor as a result of a thermal asperity event. Detection of a change in characteristic of the sensor indicative of the thermal asperity event is detected. And, responsive to such detection, a current is applied to the sensor to protect against damage thereto.

The previous descriptions are of preferred examples for implementing the invention, and the scope of the invention should not necessarily be limited by this description. The scope of the present invention is defined by the following claims.

What is claimed is:

1. Damage-protection apparatus for at least one magnetoresistive sensor operable to detect magnetic field changes of a magnetic storage medium, the sensor susceptible to a thermal asperity event associated with an asperity on the magnetic storage medium, said apparatus comprising:

a current signal generator at least selectively coupled to the magnetoresistive sensor, said current signal generator for selectably generating at least a first-magnitude current signal and a second-magnitude current signal, the first-magnitude current signal at least selectively applied to the magnetoresistive sensor;

a detector coupled to the magnetoresistive sensor, said detector for detecting a change in resistance of the magnetoresistive sensor greater than a selected threshold level, wherein said change in resistance is representative of occurrence of the thermal asperity event; and a controller coupled to said detector and to said current signal generator, said controller for receiving an indication of detection by said detector of the occurrence of the thermal asperity event and for causing said current signal generator to generate the second-magnitude current signal for at least a selected time period subsequent to detection of the occurrence of the thermal asperity event, the second-magnitude current signal, when applied to the magnetoresistive sensor for preventing damage thereto.

2. The damage-protection apparatus of claim 1 wherein said current signal generator comprises a voltage-controlled current source.

3. The damage-protection apparatus of claim 1 wherein the first-magnitude current signal selectably generated by said current signal generator is of a magnitude at least great enough for said detector to measure levels of resistance exhibited by the magnetoresistive sensor.

4. The damage-protection apparatus of claim 1 wherein the second-magnitude current signal selectably generated by said current signal generator is of a magnitude substantially corresponding to current levels applied to the magnetoresistive sensor when in an active state.

5. The damage-protection apparatus of claim 1 wherein the magnetoresistive sensor includes a pinned layer and an antiferromagnetic layer proximate thereto and wherein the second-magnitude current selectively generated by said current signal generator is great enough to maintain a selected magnetic orientation of the antiferromagnetic layer.

6. The damage-protection apparatus of claim 1 wherein the first-magnitude current signal and second-magnitude current signal are of substantially opposite directions.

7. The damage-protection apparatus of claim 1 wherein said detector comprises a threshold detector.

8. The damage-protection apparatus of claim 1 wherein the selected time period during which said controller causes said current signal generator to generate the second-magnitude current signal comprises a time period substantially corresponding to the duration of the thermal asperity event.

9. The damage-protection apparatus of claim 1 wherein the at least one magnetoresistive sensor comprises a plurality of magnetoresistive sensors and wherein said current signal generator is selectively coupled to each of the plurality of magnetoresistive elements.

10. The damage-protection apparatus of claim 9 further comprising a multiplexor coupled between said current signal generator and the plurality of magnetoresistive elements, said multiplexor for selectively coupling said current signal generator to selected magnetoresistive elements of the plurality of magnetoresistive elements.

11. The damage-protection apparatus of claim 10 wherein said multiplexor is further coupled to said controller, and wherein said controller is further operable to control operation of said multiplexor.

12. The damage-protection apparatus of claim 1 wherein the at least one magnetoresistive sensor comprises a plurality of magnetoresistive sensors and wherein said current signal generator comprises a plurality of current signal generator elements, a current signal generator element of said plurality of current signal generator elements selectively coupled to each of said plurality of magnetoresistive sensors.

13. The damage-protection apparatus of claim 12 wherein said detector is coupled to each of the magnetoresistive sensors, said detector for detecting a characteristic of any of the magnetoresistive sensors representative of occurrence of the thermal asperity event.

14. The damage-protection apparatus of claim 13 wherein said controller is coupled to each current signal generator element, said controller for causing the current signal generator element coupled to a magnetoresistive element detected by said detector to exhibit the characteristic representative of the occurrence of the thermal asperity event to generate the second-magnitude current signal.

* * * * *